United States Patent [19]
McIntosh et al.

[11] Patent Number: 5,282,691
[45] Date of Patent: Feb. 1, 1994

[54] STRUCTURAL MATERIAL AND DRAIN

[75] Inventors: James McIntosh; Graham J. Lucas, both of East Sussex, United Kingdom

[73] Assignee: Fibrescreed Limited, Uckfield, United Kingdom

[21] Appl. No.: 830,418

[22] Filed: Feb. 3, 1992

[51] Int. Cl.$^5$ .................. E02B 11/00; E01C 5/18
[52] U.S. Cl. ............................ 404/3; 404/32; 404/80; 404/82; 405/43; 405/45
[58] Field of Search .............. 404/2, 3, 32, 80, 82; 405/50, 43, 45; 106/278, 282, 281.1; 524/59, 70, 71

[56] References Cited
U.S. PATENT DOCUMENTS

| | | | |
|---|---|---|---|
| 1,740,212 | 12/1929 | Warren | 404/32 X |
| 2,147,362 | 2/1939 | Bloomberg | 404/32 X |
| 2,871,774 | 2/1959 | Johnson | 404/32 X |
| 2,977,864 | 4/1961 | Pullar | 404/32 X |
| 4,073,753 | 2/1978 | Hauge | 404/32 |
| 4,309,855 | 1/1982 | Pate et al. | 405/45 X |
| 5,100,258 | 3/1992 | Van Waggoner | 405/50 X |

*Primary Examiner*—Stephen J. Novosad
*Attorney, Agent, or Firm*—Keck, Mahin & Cate

[57] ABSTRACT

A structural material is disclosed which comprises pieces of shredded rubber bound together using a bituminous binder with the size of the pieces of rubber being big enough for an interconnected void volume to be provided within the structural material in the range of 10 to 50% with the weight of rubber being substantially greater than the weight of binder material. The invention also relates to a roadside drain in which such structural material has been applied as an upper layer above a layer of drainage material such as 30 mm aggregate leading down to a porous drainage pipe.

7 Claims, 1 Drawing Sheet

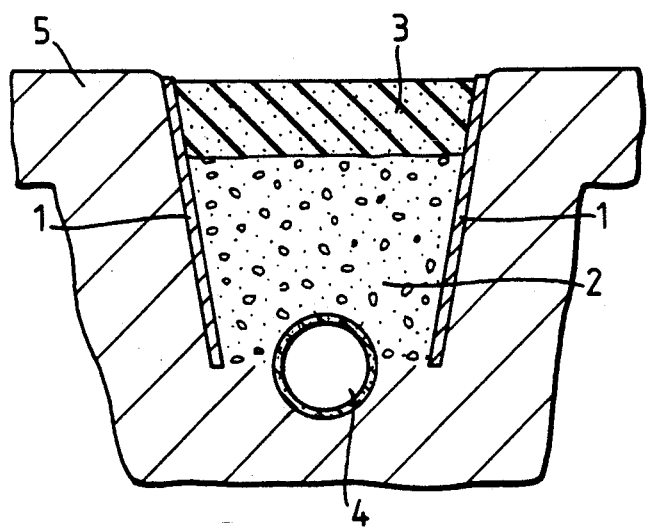

STRUCTURAL MATERIAL AND DRAIN

This invention relates to a structural material which is particularly suitable for use in roadside drains although other uses are apparent. It also relates to drains incorporating such structural material.

A common type of roadside drain, normally known as a filter drain or a beach drain, comprises a channel beside the road, the top of which will normally be at or slightly below the level of the road surface. In the bottom of this channel, there is provided a porous pipe for conducting drainage water away and the channel itself above that pipe is filled with large aggregate, for example 30 mm aggregate. During use of the drain, water flowing from the road will pass down through the chippings or aggregate to the porous pipe. While very effective, this type of drain does have one drawback, this is due to the stone in the top of the channel tending to be displaced from the channel, should a vehicle drive over it, and such displaced stones can readily be flicked up by a vehicle tyre with the consequent chance of breaking windscreens or causing other damage. A further difficulty is that the very effect of vehicles driving on those stones can cause them to crush together with the production of fines which can then tend to clog the interstices near the bottom of the drain and restrict drainage therefrom.

An object of the present invention is to provide a structural material which, although having other uses, is particularly suitable for filling the top 100 mm or so of the channel of a filter drain so that there is no loose aggregate or stone chippings exposed, the material being capable of withstanding the loading of a vehicle running over it and still being able to pass drainage water rapidly through to the lower part of the drain.

Another object of the invention is to provide drains including such structural material.

According to the present invention, there is provided a structural material comprising pieces of shredded rubber having maximum dimensions in the range of 5 to 50 mm bound together with a bituminous binder material, the weight of rubber being substantially greater than the weight of binder material such that the structural material has an interconnected void volume in the range of 10 to 50%.

Preferably, the dimensions of the pieces of rubber are in the range of 10 to 40 mm with a particularly suitable range being more closely approximating to the 30 mm size of the aggregate commonly used in the lower part of the drain. Preferably, the binder material completely coats the pieces of rubber so as to protect them from deterioration over a relatively long life at the roadside. A particularly suitable binder material comprises rubberised bitumen which may be polymerised rubberised bitumen in order further to add to the longevity of the material in use.

While the weight of rubber to binder is variable, particularly to vary the void volume of the material, a preferred ratio of rubber to binder by weight is 4 to 1. This, with 30 mm rubber pieces, will give the preferred void volume of approximately 30% although, in more general terms, the preferred void volume can be considered as being between 20 and 40%. Preferably, fibres are included in the material to assist binding of the pieces together with gaps therebetween to provide the necessary bonding and suitable fibres can be obtained by using as the pieces of rubber shredded vehicle tyres which would then contain the wire and other fibres present in those tyres.

According to another aspect of the invention, there is provided a roadside drain comprising a channel, a porous pipe at the bottom of the channel, drainage material covering the pipe and partly filling the channel, and a layer of porous surfacing material near the top of the channel covering said drainage material, said porous surfacing material comprising the structural material as referred to above.

Commonly, the drainage material will comprise 30 mm stone aggregate although, of course, other dimensions of aggregate may be used as convenient in any particular location. In an alternative embodiment of the invention, the drainage material may itself comprise a structural material in accordance with the invention but a particularly preferred form of drainage material, when comprising rubber, comprises pieces of rubber which have been lightly precoated with bituminous material without these pieces of rubber necessarily being bound to each other so that they act in the same way as the normal aggregate with the top layer of bound bituminous material then being applied thereover. However, bound-together rubber pieces may be used as the drainage material provided, of course, that it has adequate void volume to provide the required drainage.

The invention will be further described, by way of example, with reference to the single FIGURE of the accompanying drawing which shows a diagrammatic sectional view through a roadside drain.

Referring to the drawing, a filter drain is illustrated comprising a channel having sidewalls 1 with a porous pipe at the base thereof. The channel is sunk into the ground with the top of the channel shown slightly below the level of the road surface 5 although it can be substantially level therewith. The channel itself has its lower part filled with drainage material 2 comprising stone chippings or aggregate which may conveniently be 30 mm aggregate as being the usual size of aggregate used in such drains as providing good throughflow of surface water to the pipe 4. Clearly, other stone dimensions may be used as required, provided that adequate drainage is obtained. The top portion of the channel above the aggregate 2 is filled with structural material 3 in accordance with the invention. A convenient depth for the material 3 is of at least 100 mm.

In its preferred form, the structural material comprises pieces of rubber having maximum dimensions in a range of 10 to 50 mm, bound together with a bituminous binder material with the weight of rubber being substantially greater than the weight of binder material, such that the material has an interconnected void volume in the range of 10 to 50%. The bituminous binder material coats the pieces of rubber and also adheres them together so that the material 3 comprises a continuous, very porous, structure which provides a coherent upper layer to the drain. Preferably, the dimensions of the pieces of rubber are substantially greater than 5 mm, for example in the range of 10 to 40 mm, with a particularly suitable dimension being 30 mm as this can provide an adequately coated rubber bound together with the preferred void volume of about 30%. With such a construction, the weight of rubber to binder is about 4 to 1, although this weight can be varied to change the void volume with, in general, a range of 20 to 40% being the preferred range, this depending upon the ratio of rubber to binder and also upon the side of rubber chips as used.

The binder material is preferably a rubberised bitumen and in order to give a long life, despite the fact that the drain may be run over by heavy vehicles, a polymerised bitumen is preferred, this then also being resistant to any softening under hot weather conditions.

Preferably fibres are included in the structural material and these can conveniently be provided simply by manufacturing the pieces of rubber by shredding vehicle tyres. When doing this the tyre beads will normally be removed before shredding.

Instead of the stone aggregate 2, one can use a further layer of the structural material comprising bound pieces of rubber which may be either formed as a continuous bound-together layer or, alternatively, the individual pieces of rubber may be coated with a thin bituminous coating and then provided loosely in the lower part of the channel before the layer 3 of structural material is applied.

When laying the structural material of the present invention, the preferred method would be to supply the rubber and the bituminous material separately to the site, to mix the rubber with hot bituminous binder on site and then simply to apply this soft porous mixture to the top of the channel and to rake it into position where it will set on cooling to provide the required protective porous layer to the drain.

While the invention has been particularly described in connection with the use of the structural material in roadside drains of a particular type, namely filter or beach drains, it will be appreciated that the material does have other uses. For example, it could be applied to the outside of subterranean structures to provide for drainage of water down the side of the structure or it could be used in other drains, for example herringbone drains, where channels are provided for a surface, for example a sloping embankment surface, these channels then being filled with the porous structural material of the invention.

We claim:

1. A roadside drain comprising a channel, a porous pipe at the bottom of the channel, drainage material covering the pipe and partially filling the channel, and a layer of porous surfacing material near the top of the channel, covering said drainage material, said porous surfacing material comprising structural material comprising pieces of shredded rubber having maximum dimensions in the range of 5 to 50 mm bound together with a bituminous binder material, the weight of rubber being substantially greater than the weight of binder material such that the structural material has an interconnected void volume in the range of 10 to 50%.

2. A drain according to claim 1, wherein the drainage material also comprises a structural material comprising pieces of shredded rubber having maximum dimensions in the range of 5 to 50 mm bound together with a bituminous binder material, the weight of rubber being substantially greater than the weight of binder material such that the structural material has an interconnected void volume in the range of 10 to 50%.

3. A drain according to claim 1, wherein the drainage material comprises pieces of rubber which have been lightly precoated with bituminous material.

4. A drain according to claim 3, wherein the precoating material is rubberised bitumen.

5. A drain according to claim 1, wherein the pieces of rubber have dimensions in the range of 10 to 40 mm, the binder material coats the pieces of rubber, said binder material comprising polymerised rubberised bitumen, with the proportion of rubber to binder being approximately 4 to 1 by weight.

6. A drain according to claim 2, wherein the drainage material structural material comprises pieces of rubber that have dimensions in the range of 10 to 40 mm, the binder material coats the pieces of rubber, said binder material comprising polymerised rubberised bitumen, with the proportion of rubber to binder being approximately 4 to 1 by weight.

7. A drain according to claim 1, wherein the structural material includes fibres to assist in binding the rubber pieces to one another.

* * * * *